United States Patent [19]

Jodlbauer

[11] Patent Number: 4,886,675

[45] Date of Patent: Dec. 12, 1989

[54] FAST-COOKED GRANULAR RICE PRODUCT AND METHOD OF PRODUCTION THEREOF

[75] Inventor: Heinz D. Jodlbauer, Berlin, Fed. Rep. of Germany

[73] Assignee: Die intech Dr. Jodlbauer Gesellschaft fur Innovation und Technoogie mbH, Fed. Rep. of Germany

[21] Appl. No.: 99,094

[22] Filed: Sep. 21, 1987

[30] Foreign Application Priority Data

May 16, 1987 [DE] Fed. Rep. of Germany ....... 3716467

[51] Int. Cl.$^4$ .......................... A23L 1/168; A23P 1/12
[52] U.S. Cl. ..................... 426/242; 426/104; 426/463; 426/618; 426/627
[58] Field of Search ............... 426/618, 309, 578, 242, 426/448, 463, 516, 104

[56] References Cited

U.S. PATENT DOCUMENTS

| | | | |
|---|---|---|---|
| 2,278,469 | 4/1942 | Musher | 426/309 |
| 4,325,976 | 4/1982 | Harrow et al. | 426/463 |
| 4,440,794 | 4/1984 | Davies | 426/578 |
| 4,446,163 | 5/1984 | Galle et al. | 426/448 |
| 4,521,436 | 6/1985 | Love et al. | 426/463 |

FOREIGN PATENT DOCUMENTS

| | | |
|---|---|---|
| 2837294 | 3/1979 | Fed. Rep. of Germany. |
| 59-192047 | 10/1984 | Japan. |
| 60-66957 | 4/1985 | Japan. |

OTHER PUBLICATIONS

D. F. Houston, Rice: Chemistry and Technology, 1972, pp. 24,25,269,272-277, 408.

Fischer, Kurt; "Die Reismullerei", 1957, p. 83.

*Primary Examiner*—Donald E. Czaja
*Assistant Examiner*—Mary S. Mims
*Attorney, Agent, or Firm*—Kinney & Lange

[57] ABSTRACT

Fast-cooked granular rice product, consisting of the rice components obtained as byproducts in producing table rice from raw rice and comprised of husking flour, scouring flour, polishing flour and broken rice, including 20 to 40% by weight of water, related to the weight of the anhydrous components, partly agglutinated and granulated.

12 Claims, No Drawings

FAST-COOKED GRANULAR RICE PRODUCT AND METHOD OF PRODUCTION THEREOF

The invention relates to a fast-cooked rice product and a method of production thereof.

To obtain polished rice, also called table rice or white rice, raw rice is first freed from undesirous foreign matters and thereafter the dehusked grains are sorted according to their thickness. This improves the husking effect and reduces the occurrence of fracture upon husking. The husked product passes over sorting sifters which withdraw husking flour and broken rice. Thereafter the husks are drawn off. The separation of unhusked and husked grains (brown rice) takes place by the so-called paddy selection tables. The paddy rice must be rehusked once again, whereas the brown rice is subjected to the scouring step.

Scouring takes place at an emery-covered cone which rotates in a stationary wire shell. The rice has to pass up to four such scouring cones, until the pericarp which is the fruit or seed vessel, but also germs and the aleurone layer are abraded and each drawn off through the wire shell.

To remove last remnants from the grains and lend them a smooth appearance, a polishing cone is arranged therebehind which is covered with leather strips rather than emery. Polishing yields the so-called polishing flour. Finally the white rice obtained is freed from fragments and sorted according to size via sorting sifters.

In the above-described process in the rice mill the chief amount of the vitamins and minerals of the wholemeal rice are removed with the pericarp and the aleurone layer.

The approximate gain rates in processing raw rice to table rice are as follows: 45 to 55% white rice (table rice), 9 to 17% broken rice, 7 to 12% husking and scouring flour, 20 to 24% husks and other offals.

The amount of vitamins is substantially higher in the milling products than in the kernel.

The same applies also to the minerals. Of the total ash content of the brown rice the white rice contains only 28%, the germ 10%, the scouring flour 51%, though.

About half the total amount of phosphor contained in the brown rice is in the "husk", about 8% in the kernel, and about 42% in the endosperm.

The marinal layers of the brown rice, as the germ, are rich in protein and fat, so that the content of said two matters are about twice as high (raw protein) or higher by a multiple (raw fat) in the scouring flour than in the white rice. As to the amino acid composition, the amount of cystine, glycine, histidine and in particular lysine is higher in the scouring flour than in the white rice, the amount of glutaminic acid, leucine and phenylalanine is, however, lower.

Whole-meal granules are equal to whole-meal rice.

The above explanations reveal that the most nutritious components of the unhusked rice grain are no longer present when the rice is used as human food, since especially high-lysine proteins, the vitamins and the minerals are separated by the processing of the rice.

The components resulting from husking, scouring and polishing of the raw rice are hitherto used as fodder (see the manual "Die Reismüllerei" by Kurth Fischer, published by Moritz Schäfer, Detmold, page 83). Broken Broken rice is converted to grits and starch.

JP-A2 59-192047 (JP-Z. Patent Abstracts of Japan, Vol. 9, 1985, No. 52, C-269) teaches that the bran of a particular particle size distribution obtained upon grinding cereals and mixed with water is extruded as binder-free pellets. Such procedure is inapplicable to the rice components obtained as byproducts upon processing raw rice to table rice, because the water binding capacity is much too low.

JP-A2 60-66957 (dito No. 196, C-297) proposes to roast specific fractions obtained upon polishing rice, to granulate the brown powder and dry it in the moving bed and spray it with a binder. This method is complicated; only a certain part of the byproducts obtained upon treating raw rice is used, so that the final product fails by far to contain all nutritious components. And, finally, the product additionally contains a binder.

German Disclosed Specification No. 28 37 294 describes the production of a low-calory article of food on the basis of bran. Bran, in particular wheat bran, is mixed with gluten and wheat flour, water is then added and the resultant mixture is passed through a dual-worm extruder in which the temperature rises from 80° to 220° C. At this temperature the components of the mixture are drastically reduced, so that the nutritive quality of the final product is necessarily low. In addition, the starting materials are incomparable with broken rice, husking flour, scouring flour and polishing flour from rice.

The object of the present invention is to provide a rice product which combines three desirous properties. It contains the nutritious substances of raw rice that hitherto were lost for human food as byproducts in the production of table rice; it has the appearance of table rice, and has only a very short cooking time to be ready. Moreover, a method is provided to produce such rice product.

It has been found that all byproduct components ie husking flour, scouring flour, polishing flour and broken rice, obtained in converting raw rice into table rice (white rice), can be combined into a product which contains unchanged the nutritious components which are contained in the raw rice, especially in the marginal layers of brown rice. The product has the form similar to that of table rice, and it is cooked in a very short time of about 3 to 4 minutes.

In accordance with the invention, the product is obtained in that the rice byproduct components are mixed with a certain amount of water, and that the mixture is passed through a single-worm extruder in which the mixture is compressed to a certain extent and is heated from room temperature at the filling aperture of the extruder to about 110° C. at the exit nozzle. This causes soaking, partial hydrolysis and finally agglutination of the starch contained in the byproduct components, whereby the required cohesion is ensured. The temperature is high enough so that partial hydrolysis and agglutination can occur, but, on the other hand, low enough so that the danger of reduction of carbohydrates and proteins or killing of B1 vitamin exists not at all or only minimally. Moreover, the water evaporates so that a dry product is obtained.

The feature of obtaining the product in the form of granules substantially of the size of table rice is achieved in a simply manner in that a multihole nozzle is used as extruder nozzle whose holes have the diameter of the desirous granule thickness, e.g. of 1 to 5 mm. The thin ropes emerging from the extruder nozzle cool quickly and are then cut to the desirous granule length of 5 to 10 mm. A granule size of 1.5 mm in thickness and 8 mm in length is preferred.

According to a preferred embodiment of the invention, the product is also post-dried so that the moisture content is maximally 6% by weight. Thereafter the product is durable for a long time. If, however, the product is to be used soon, post-drying can be omitted. Also refrigeration of the semi-finished product, e.g. as semi-preserve is possible.

According to another preferred embodiment, salt and/or curry or another spice is added to the mixture of the byproduct components and water. Obtained thereby is a particularly delicious rice product to which no seasonings need be added later.

The byproduct components are mixed with so much water as required to soak for partial or full agglutination. The byproduct components received from the rice mill have normally a moisture content of 8 to 14% by weight. Under this premise, 12 to 24 kg water are required for 100 kg byproduct components. In the case of a moisture conent of e.g. 11% by weight 18 kg of water are required for 100 kg of byproduct components.

Mixing can be executed in any known mixer, such as a paddle mixer, a mixer provided with magnetic agitators, or a drum mixer.

The worm extruder used is a single-worm extruder. It is heatable. Worm length and compression depend of course on the size of the charge amount. In the case of a total charge of about 120 kg (byproduct components plus water) a worm extruder having a worm of 90 mm in diameter, a worm length of 1500 mm and a compression of 2:1 has proved expedient. Preferably the compression in the first third is from 100% by volume to 75% by volume and in the second and third thirds from 75 to 50%. It is sufficient to set the extruder wall to a relatively low temperature, e.g. to 40° to 60° C. Since the mass is heated owing to the compression (in respnse to the worm speed), the resultant mass temperature at the exit nozzle is 100° to 110° C. The rise in temperature is conducive to the hydrolysis and agglutination and the evaporation of the water, so that a generally dry product is obtained.

The ropes emerging from the multihole nozzle are then cut into granules of desired length. To this end, a rotary circular knife or timed drop knives or any other suitable cutting device can be used.

When the granular rice product is post-dried to still further improve its durability, this can be done by any known method, e.g. in a hot-air stream, via IR radiation or the like. Also a microwave treatment for surface drying purposes or layer drying of the extruded granule is favourable. The rice granules can also be specifically re-moistured (penetration depth e.g 2 mm) to be thereafter exposed to a high microwave dose so as to achieve drying to a predetermined depth and e.g. a desired browning effect. A further possibility consists in spraying the rice granule with a concentrated sugar solution, thereby obtaining a frosted rice granule upon microwave treatment. Such product is particularly suitable for making rice pudding for instance.

The rice product obtained, as table rice, can be cooked in water at about 100° C., the product being, however, already ready after 3 to 4 minutes.

The invention will now be described by way of an exemplary embodiment to which the invention is not restricted, however.

A paddle mixer was filled with
100 kg of a mixture received from the rice mill and containing approximately 50 kg of husking, scouring or polishing flour, up to about a third of each, and 50 kg of broken rice having a moisture content of about 11%,
18 l water at a temperature of 18° C.,
1.5 kg salt,
2.0 kg curry.

The above components were well mixed and subsequently fed into a single-worm extruder having a worm of 90 mm in diameter and a worm length of 1.500 mm. The spiral volume decreases in the first third of the worm from 100% to about 75%, in the second and third thirds to about 50% of the initial volume, so that an increasing pressure with respect to the exit nozzle was build up in the extruder. The mass temperature before the exit nozzle was at 110° C.

The nozzle included a plurality of round nozzle bores of a diameter of 1.2 mm. Before the nozzle is arranged a rotary cutting knife which cuts each of the ropes emerging from the nozzle bores into lengths of about 7 to 10 mm.

The elongated rice-like granules obtained were dried via hot air to a moisture conent of about 6% to reduce the water activity of the granular product and thus ensure a higher durability.

The drying process can be varied depending upon the desired moisture content, is dispensable, though.

A very delicious product was obtained which has the typical curry rice flavour, is of high quality in terms of physiology of nutrition and is made of a very cheap raw material.

I claim:

1. A granular rice product comprising rice components obtained as byproducts in producing table rice from raw rice, the rice components comprising husking flour, scouring flour, polishing flour and broken rice, including 20 to 40% by weight of water, related to the weight of the anhydrous components, partly agglutinated and granulated.

2. The rice product as in claim 1, characterized by a granule length of 5 to 10 mm and a granule diameter of 1 to 5 mm and a moisture content of maximally 6% by weight.

3. The rice product as in claim 1, characterized by an additional amount of 0.1 to 0.3% by weight of salt or curry or both salt and curry.

4. A method of producing rice product characterized in that 100% by weight of a mixture of rice components obtained as byproduct in processing raw rice and comprised of husking flour, scouring flour, polishing flour and broken rice with an average moisture content in the range of 8 to 14% by weight is well mixed with 12 to 24% by weight of water; said mixture is passed though a heated single-worm extruder for partial hydrolysis and agglutination, the extruder having a certain compression and provided with a multihole nozzle with a hole diameter of 1 to 5 mm; and the emerging ropes are cut to the desirous granule length.

5. Method as in claim 4, characterized in that a mixture of 100% by weight of the byproduct components with a moisture content of 11% by weight and 18% by weight of water at 18° C. is used.

6. Method as in claim 4, characterized in that 0.1 to 0.3% by weight of salt or curry or both salt and curry is added to the mixture comprised of the byproduct components and water.

7. Method of claim 4, characterized in that an extruder with a compression of about 2:1 is used, and that the surface temperature is set to about 40° to 60° C. so that the temperature of the mass at the exit nozzle is between 100° and 110° C.

8. Method of claim 4, characterized in that a single-worm extruder including a worm with 90 mm in diameter and 1500 mm in length is used, the spiral volume being reduced in the first third from 100 to 70% of the initial volume and in the second and third thirds to 50% thereof.

9. Method of claim 4, characterized in that the granular product obtained is post-dried via hot air to a moisture content of maximally 6% by weight.

10. Method of claim 4, characterized in that drying takes place via microwaves.

11. Method as in claim 10, characterized in that a specific humidification takes place prior to the drying step.

12. Method as in claim 10, characterized in that humidification with a sugar solution is performed prior to the drying step.

* * * * *